United States Patent
Nichols

[15] 3,668,583
[45] June 6, 1972

[54] TECHNIQUES FOR CASTING ENCAPSULATED COILS

[72] Inventor: Thomas G. Nichols, Rome, Ga.
[73] Assignee: General Electric Company
[22] Filed: May 10, 1971
[21] Appl. No.: 141,734

[52] U.S. Cl. ............................. 336/58, 174/15 R, 336/60, 336/96
[51] Int. Cl. ............................................. H01f 27/10
[58] Field of Search ............... 174/15 R; 336/55, 57, 58, 60, 336/61, 96

[56] References Cited

UNITED STATES PATENTS

| | | | |
|---|---|---|---|
| 2,643,282 | 6/1953 | Greene | 174/15 R |
| 2,985,707 | 5/1961 | Ahearn et al. | 336/60 X |
| 3,201,728 | 8/1965 | McWhirter | 336/60 |
| 3,264,589 | 8/1966 | Dutton | 336/58 X |

Primary Examiner—Thomas J. Kozma
Attorney—J. Wesley Haubner, Barry A. Stein, Frank L. Neuhauser, Oscar B. Waddell and Joseph B. Forman

[57] ABSTRACT

Disclosed is a vaporization cooled inductive apparatus. The apparatus comprises a winding assembly encapsulated in a cast body of solid insulating material and disposed in a sealed tank. The cast winding assembly includes at least one liquid absorbent wick and a vaporizable liquid containing reservoir. The wicks carry said liquid to hot interior regions of the winding. Condenser means are provided for recycling vapors produced during the cooling process.

8 Claims, 4 Drawing Figures

PATENTED JUN 6 1972
3,668,583
Fig. 1.
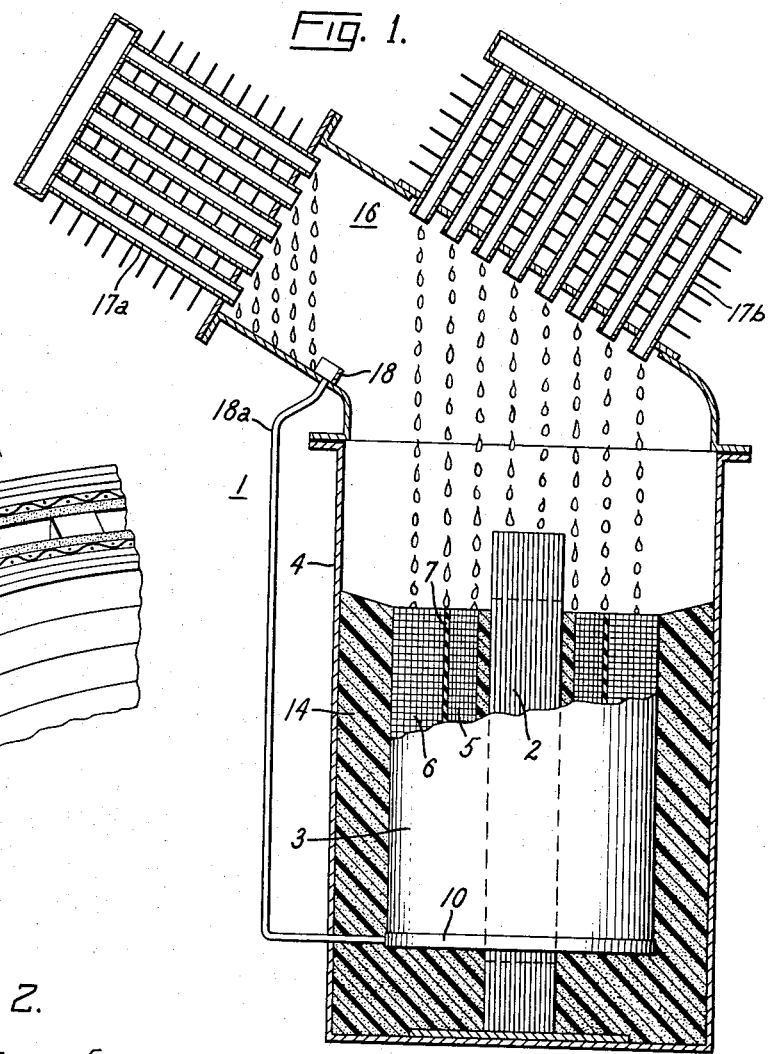
Fig. 4.
Fig. 2.
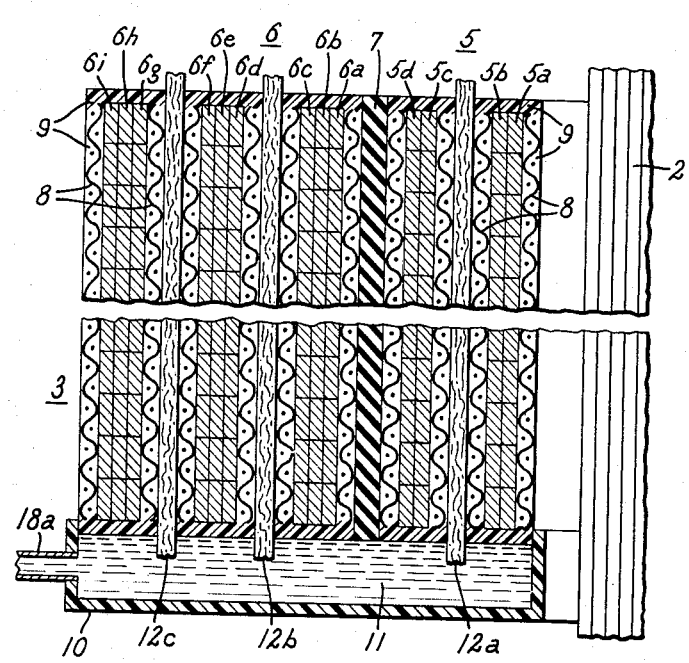
Fig. 3.
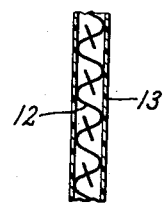
INVENTOR:
THOMAS G. NICHOLS,
BY Barry C. Stein
ATTORNEY

3,668,583

TECHNIQUES FOR CASTING ENCAPSULATED COILS

BACKGROUND AND OBJECTS OF THE INVENTION

My invention relates to cooling of electrical apparatus by means of a vaporizable liquid, and more particularly to such cooling of static electric induction apparatus such as power transformers, reactors and the like. The invention is especially applicable to any electrical apparatus having main high power inductive windings enclosed in a cast sheath of insulating material, as by encapsulation in a body of molded insulating resin or the like.

Encapsulation of electrical coil windings in cast insulating material such as a phenolic, polyester or epoxy resins is commonly utilized in such lower power electrical apparatus as motor starters and other control devices. While resin encapsulation diminishes the ability of an electric coil to dissipate heat generated by the current passing through it, heat generation has generally not proven to be a critical or limiting parameter in low power electrical devices having current ratings at the level of control or communication circuits.

In design of electrical induction apparatus for high power applications, such as transmission and supply transformers and reactors for utility and industrial applications, it has long been recognized that dielectric strength close to the winding could be improved by encapsulating the main high power windings in solid insulating material, and that overall size and weight of the apparatus could be reduced accordingly. However, solid encapsulation of large multi-layer windings of high power rating introduces severe cooling problems not usually susceptible to satisfactory resolution by the otherwise common expedient of immersing transformer coils in oil or other liquid cooling media. Casting resins having good electrical insulating qualities are generally not good heat conductors, so that a resin-sheathed coil tends to retain internally generated heat.

Accordingly, it is a general object of my invention to provide new and improved cooling means for electrical induction apparatus having coil windings sheathed in solid thermosetting insulating material.

It is a more particular object of my invention to provide improved means for utilizing a vaporizable liquid to cool resin-encapsulated coil assemblies in high power electric induction apparatus.

SUMMARY OF THE INVENTION

In carrying out my invention in a preferred form I encapsulate the main winding assembly of an electric power transformer in a cast body of epoxy resin by disposing a first layer of said resin about and in intimate contact with a winding layer. Liquid absorbent means is disposed similarly about said resin layer for effectuating vaporization cooling of said winding assembly. A second layer of epoxy resin is disposed about the liquid absorbent means and a reservoir containing a vaporixable liquid coolant is provided adjacent thereto with a portion of the absorbent means being immersed in the liquid. The liquid absorbent means is adapted for transporting the liquid coolant from the reservoir to the surface of the epoxy layer in intimate contact with the winding layer so that the winding-generated-heat may be extracted by said liquid as it vaporizes. Condenser means are provided to convert the resulting vapor into liquid form and return it to the winding assembly.

The winding assembly may include a plurality of concentric windings each winding of which may be encapsulated and cooled in the above described manner.

In accordance with one embodiment of my invention the liquid absorbent means comprises a wick material which is disposed about and in intimate contact with said first resin layer.

In accordance with another embodiment of my invention the liquid absorbent means comprises a pair of wicks which are separated from one another by a passageway. This variant arrangement enables unrestricted vaporization of the cooling liquid from a lateral surface of each annual wick. Unrestrained vaporization serves to effectuate efficient heat extraction. The passageway also serves to enable the cooling process produced vapors to freely flow to the condenser and in so doing it enables the reliquification of those vapors to occur within a relatively short time after vaporization.

In either embodiment the wick arrangement serves to effectuate efficient cooling of the winding by insuring that maximum wetting of the epoxy layer in intimate contact therewith occurs.

DESCRIPTION OF THE DRAWINGS

My invention will be more fully understood and its various objects and advantages further appreciated by referring now to the following detailed specification taken in conjunction with the accompanying drawings in which:

FIG. 1 is a vertical cross sectional view, partially in section, of a vaporization cooled transformer in accordance with my invention.

FIG. 2 is a cross sectional view of a portion of the winding assembly of the transformer shown in FIG. 1.

FIG. 3 is a cross sectional view of a portion of the winding assembly shown in FIG. 2.

FIG. 4 is a perspective view, partially in section of a winding assembly in accordance with another embodiment of my invention.

DETAILED DESCRIPTION OF THE PREFERRED EMBODIMENTS

Referring to FIG. 1, there is illustrated generally an induction apparatus or transformer 1 in accordance with my invention. The transformer comprises a magnetizable core 2 and an associated winding assembly 3 disposed within a sealed enclosure or tank 4. The winding assembly 3 comprises a high voltage winding and a low voltage winding each of which is concentrically disposed about a leg of core 2. Each winding includes a plurality of winding layers and each layer may be constructed of single or multistrand electrical conductor.

As can be seen in FIG. 2, winding 3 comprises an annular low voltage winding 5 and an annular high voltage winding 6. The low voltage winding is made up of four winding layers, namely, 5a, 5b, 5c and 5d. The high voltage winding 6 is made up of nine winding layers, namely, 6a, 6b, 6c, 6d, 6e, 6f, 6g, 6h, and 6i. Electrical insulation between high and low voltage windings is provided by disposing a solid insulating sleeve 7 between such windings.

The assembly 3 is cast into a compact integral unit by disposing glass mesh roving material 8 about selected winding layers, impregnating the roving with a thermo-setting resin or epoxy 9 and encapsulating the entire assembly in the same cast resin.

In order expeditiously to extract heat generated by the windings during their operation I have included novel cooling means in the winding assembly 3. My cooling means operate on the principle of vaporization cooling. As is known in the art, vaporization cooling is a technique utilizing the phenomenon that a fluid, in changing from a liquid to a gas, absorbs a large amount of heat (i.e., an amount of heat equal to its heat of vaporization) from any hot body in contact with it without a temperature increase above the boiling point of the liquid.

As can be seen in FIG. 2 the integrally cast winding assembly 3 includes a bottom reservoir 14 containing a vaporizable liquid coolant. Liquid absorbing means are provided to carry the liquid from the reservoir and along the peripheral surface of the several epoxy coated winding layers whereby the liquid vaporizes and in so doing extracts heat generated in the winding interior.

In accordance with one embodiment of my invention the liquid absorbing means consists of annular wicks 12a, 12b and 12a. As can be seen in FIG. 2 two wicks, 12b and 12c, are provided in the high voltage winding and one wick, 12a, is provided in the low voltage winding. The number of wicks utilized in any particular winding is dependent upon the amount of heat generated therein. The number of wicks shown in FIG. 2 is therefore purely exemplary.

Each wick is composed of a liquid absorbent material, for example duck cloth, and is arranged so that its lower extremity is immersed in the liquid contained in reservoir 10. When arranged in this manner the wicks carry the liquid coolant, via capillary action, from reservoir 10 to the abutting epoxy layers adjacent the windings, whereby complete wetting of the epoxy layers occurs without the formation of cooling efficiency-robbing rivulets.

As can be seen in FIG. 3 an insulating polyester film of sheet material 13 is provided on each side of the wick means so that during fabrication of the winding assembly, liquid epoxy will be prevented from impregnating the adjacent wick. However, it is desirable that the cast epoxy adhere closely to the polyester film, so that heat transfer from the winding layers through the epoxy layer and the film to the liquid in the wick will not be appreciably impeded.

In operation, the heat generated by the electric current flowing through the winding layers is conducted through the epoxy layers encapsulating those winding layers. The vaporizable liquid is carried by the wicks from the reservoir to said epoxy layers, whereby some of the heat is absorbed by the liquid and its temperature is increased thereby. When the boiling point of the liquid is reached, a large amount of heat, equal to the heat of vaporization of the liquid, is absorbed without a further increase in temperature of the liquid. The vapors which result from the vaporization of the liquid travel upward through the wick and eventually leave the wick at its upper edge or edge region.

A filler material 14, such as a closed cell foam, is provided inside enclosure 4, as shown in FIG. 1. The filler occupies a large volume in the enclosure and thus forces the vapors to collect in the upper portion thereof. This collected vapor is recycled into liquid form for reuse in the vaporization cooling process. To that end, and by way of illustration, I have shown in FIG. 1 a condenser 16 built into the lid of tank 4 and containing a plurality of cooling tubes 17a and 17b. The cooling tubes are adapted for converting the cooling-process-produced-vapors into liquid droplets and for returning them to the winding assembly. For example, the liquid droplets condensing on tubes 17a fall into a liquid trap 18. The liquid collected in this trap is conducted via tube 18a back into the reservoir 10. The liquid droplets condensing on tubes 17b fall onto the upper portion of the winding assembly where they wet the upper extremities of the wicks. This arrangement expedites the vaporization cooling process by effectuating a fuller wetting of the wicks.

FIG. 4 is a perspective view of a portion of the high voltage winding 6 with a modified liquid absorbing means. In this embodiment of my invention, in lieu of the wicks shown in FIG. 2, I utilize absorbent means including a pair of liquid absorbent wicks 19 interposed between adjacent winding layers. The wicks 19 are separated from one another by insulating spacers 20 to provide a vapor passageway or space 21 therebetween. The purpose of this space is to enable the liquid in the wicks to vaporize from a lateral surface of each wick without appreciable restraint. Since unrestrained vaporization effectuates maximum heat absorption efficiency, this modification is particularly useful in high power winding assemblies. Furthermore, the space between the wicks serves as an unobstructed passageway through which the vapors travel to the condenser. This enables the recycling of the vapors back into the liquid form soon after their vaporization in the wicks.

As should be appreciated a polyester film is not provided on each side of the wicks in this embodiment since this would impede the egress of the vapors from the wicks 19 into the passageway 21. Rather, a polyester film is provided on each wick between it and the abutting epoxy layer (although such a construction cannot be seen in FIG. 4).

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. An electrically inductive apparatus comprising:
   a. a sealed tank;
   b. a winding assembly disposed within said tank, said assembly comprising:
      i. an electrically conductive winding layer, said wining layer generating heat upon the passage of electric current therethrough;
      ii. a first insulating means comprising a thermosetting resin disposed about and in contact with said winding layer;
      iii. a first liquid absorbent wick disposed about and in contact with said first insulating means;
      iv. a second insulating means comprising a thermosetting resin disposed about said wick;
      v. a liquid reservoir disposed adjacent to said winding layer and said wick;
      vi. a vaporizable liquid disposed in said reservoir and in contact with a portion of said wick, said first wick being adapted for carrying the liquid to said first insulating means whereupon the heat generated by said winding layer is absorbed by said liquid as said liquid vaporizes; and
   c. condenser means for converting the resulting vapors into liquid form and for returning a portion of said liquid to said reservoir.

2. The inductive apparatus as specified in claim 1 wherein an insulating film is disposed on said first wick and in contact with said first insulating means.

3. The inductive apparatus as specified in claim 1 wherein said condenser means is disposed in said tank above said winding assembly and wherein a filler material is provided within said tank and disposed about said winding assembly.

4. The inductive apparatus as specified in claim 1 wherein said first wick has an upper and a lower extremity and wherein said reservoir is disposed adjacent to the lower extremity of said wick and wherein said condenser means also returns a portion of said liquid to the upper extremity of said wick.

5. The inductive apparatus as specified in claim 1 wherein a second liquid absorbent wick is disposed about said first wick between said first wick and said second insulating means, said first and second wicks being spaced apart from one another to define a vapor passageway therebetween.

6. The inductive apparatus as specified in claim 1 wherein a vapor passageway is provided between said first wick and said second insulating means.

7. The inductive apparatus as specified in claim 5 wherein said first wick has an upper and a lower extremity and wherein said reservoir is disposed adjacent to the lower extremity of said wick and wherein said condenser means also supplies a portion of said liquid to the upper extremity of said wick.

8. The inductive apparatus as specified in claim 7 wherein a filler material is provided within said tank and disposed about said winding assembly.

* * * * *